United States Patent [19]
Finn

[11] Patent Number: 5,459,071
[45] Date of Patent: Oct. 17, 1995

[54] COMPOST CURING SYSTEM

[75] Inventor: Larry J. Finn, Gladewater, Tex.

[73] Assignee: Bedminster Biconversion Corporation, Cherry Hill, N.J.

[21] Appl. No.: 235,970

[22] Filed: May 2, 1994

[51] Int. Cl.[6] .................................................. C12N 1/02
[52] U.S. Cl. ........................... 435/290.2; 435/290.4; 366/345; 366/346
[58] Field of Search ........................... 422/184; 435/305, 435/316; 366/345, 346

[56] References Cited

U.S. PATENT DOCUMENTS

| | | | |
|---|---|---|---|
| 1,036,327 | 8/1912 | Pickett | 71/21 |
| 1,193,581 | 8/1916 | Mansbendel | 71/21 |
| 2,895,720 | 7/1959 | Koch | 259/5 |
| 3,114,622 | 12/1963 | Hardy | 71/9 |
| 3,341,301 | 9/1967 | Carbona | 23/259.1 |
| 3,776,528 | 12/1973 | Toto | 259/183 |
| 3,876,055 | 4/1975 | Tyznik | 198/7 |
| 3,982,772 | 9/1976 | Scherer | 280/462 |
| 4,350,208 | 9/1982 | van der Lely | 172/1 |
| 4,397,674 | 8/1983 | Laughbaum | 71/9 |
| 4,457,630 | 6/1984 | Pannell | 366/345 |
| 4,478,520 | 10/1984 | Cobey | 366/345 |
| 4,495,290 | 1/1985 | Ito | 435/315 |
| 4,559,073 | 12/1985 | Minato | 71/9 |
| 4,828,399 | 5/1989 | Pacentino | 366/345 |
| 4,976,095 | 12/1990 | Schnittjer | 56/350 |
| 5,395,417 | 3/1995 | Thomas | 71/5 |
| 5,501,152 | 11/1895 | Barr . | |

Primary Examiner—David A. Redding
Attorney, Agent, or Firm—Stanley H. Zeyher

[57] ABSTRACT

A compost curing system utilizing a compost turner of generally V-shaped configuration, one leg of the "V" being formed by counter-rotating ribbon augers and the other leg of the "V" being formed by pair of over-under conveyors, the lower conveyor being adjustably extendable to vary the throw of the conveyor system. The legs of the "V" are pivotally interconnected to permit their angular adjustment and are pivotally mounted on a frame structure for attachment to a motorized conveyance. The system includes means for injecting air into compost undergoing treatment and air collection and air treatment apparatus for controlling the temperature of process air emanating from the compost pile for reuse and for deodorizing the air prior to its release to the atmosphere.

12 Claims, 8 Drawing Sheets

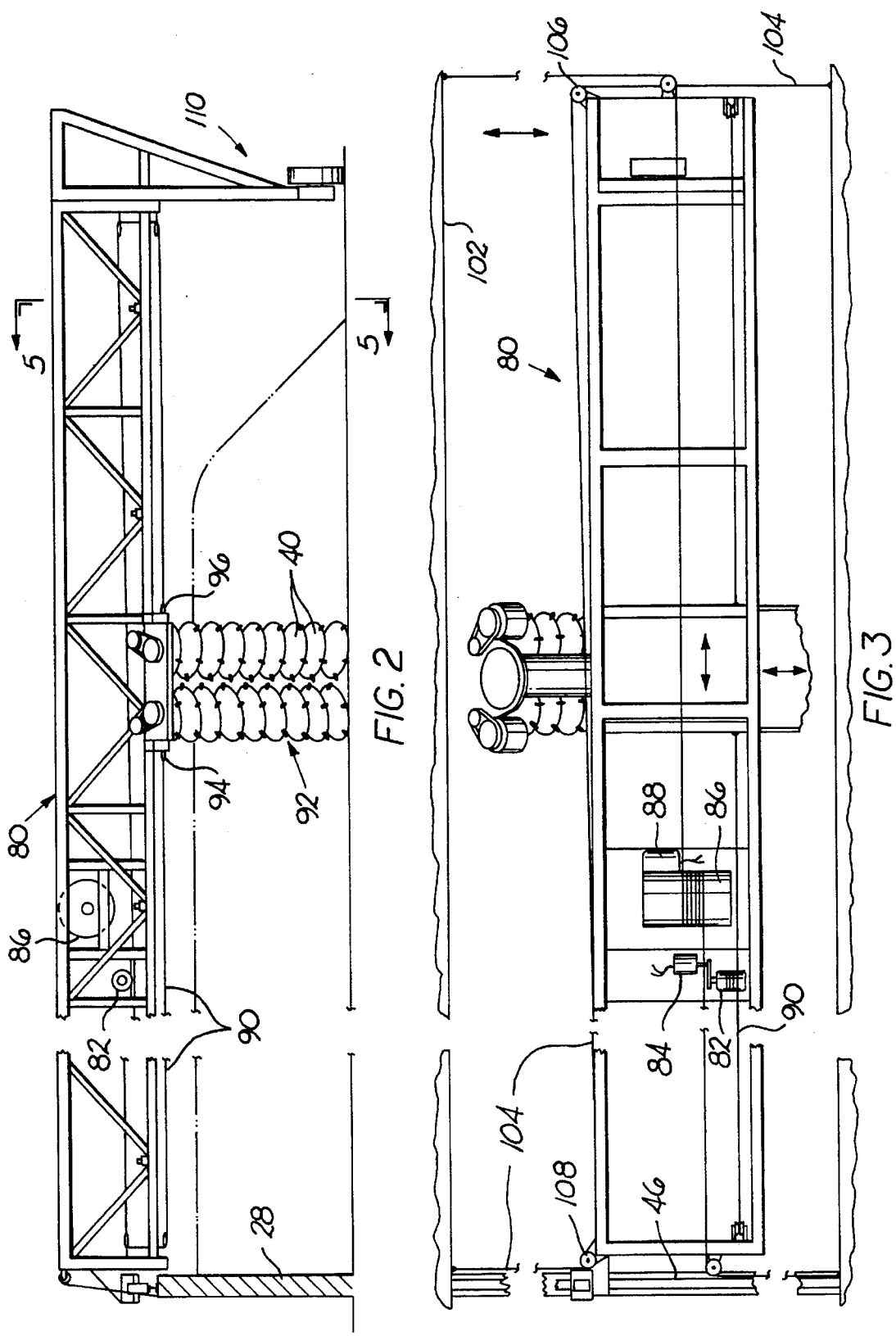

5,459,071

COMPOST CURING SYSTEM

TECHNICAL FIELD

This invention relates broadly to a compost curing system and more particularly to means for achieving automatic turning of compost and conditioning of process air used in the system.

BACKGROUND ART

Prior art systems for composting solid waste and sewage sludge typically employ one or more multi-state digesters in which material being treated undergoes staged microbial decomposition. The conventional digester is divided into two or more compartments or stages and during material processing is rotated while air is circulated through the digester at controlled rates under predetermined conditions in a flow direction counter to the material flow. The climate in each stage is maintained to achieve the optimum development of the type and species of microorganism predominant in that stage. Spent air is vented from the digester as needed to maintain optimum climatic conditions in each of the operating stages. Temperatures are kept below 150° F. to ensure the maximum rate of composting consistent with maintenance of the microbial population. Typical of such prior art systems and methodology of operation are those set out and described in U.S. Pat. Nos. 3,245,759 and 3,138,447 assigned to the assignee of the present invention, the teachings of which are hereby incorporated by reference.

The method and apparatus for manufacture of compost described in those patents are designed to produce aerobic decomposition of organic waste materials by maintaining within the apparatus in which the method is carried out conditions suitable for optimum propagation of the different types of aerobic bacteria on which such decomposition depends. The apparatus comprises a digester in the form of a cylindrical drum mounted for rotation on an axis which is slightly declined towards the discharge end relative to the horizontal. The interior of the digester is divided into a series of compartments or chambers by a plurality of transverse partitions spaced along the axis of rotation. Each partition is provided with transfer buckets which are selectively opened and which when opened, transfer material from compartment to compartment from the higher to the lower end of the drum, the raw waste organic material being fed into the digester at the higher end and partially cured compost being withdrawn at the lower end.

An important step in the overall composting process is the final curing of the compost to reduce pathogens after it exits the digester. It is to this phase of the composting process that the present invention is directed.

SUMMARY OF THE INVENTION

The compost turning and air control system comprising the present invention provides an automatic and highly versatile means for processing compost stored within a staging area.

The turning mechanism is movably suspended in overhanging relation to the compost pile by means of a bridge crane or truss-like structure. The crane is mounted for movement from front to back along the length of the pile and the turning mechanism is adapted to be attached to a carrier mounted for movement along the truss from side to side across the pile. The compost turner itself is of generally V-shaped configuration, one leg of which is comprised of a paired set of counter-rotating ribbon augers and the opposite leg consist of an associated conveyor system. The augers and conveyor are mounted to the overhead movable crane through support structure. To permit use of the turner with compost piles of varying heights and to permit variable spacing between turned and unturned sections of the compost pile, the augers and conveyor system are both pivotally adjustable relative to the support structure and to each other.

A preferred arrangement is to support one end of the crane on top of a compost retaining side wall for movement along a track mounted on the wall's upper surface and to support the opposite end of the crane either on a wheel-footed beam adapted for movement along the floor of the staging area or on an opposing sidewall. As the turner starts its side-to-side travel along the crane, the augers are activated and brought into contact with edge portions of the compost pile at its angle of repose. The ribbon blades of the screws are uniquely provided along their perimeter with Sandvik® mounting blocks and teeth. The teeth rake the compost pile, fragmenting the compost for easy deposition onto the blade surfaces. As the blades rotate, compost deposited on surface portions of the blades is caused to slide down the blade's surface. At the base of the screws are paddle wheels which propel the compost onto a conveyor belt located at the base of the screws. The conveyor is pivotally mounted to the crane to permit proper positioning of the conveyor. When properly adjusted and activated, the conveyor throws compost deposited on its surface into newly formed piles for further curing. A unique feature of the conveyor system is the adjustability of its throw. This is accomplished through use of an extendible auxiliary conveyor carried by the main conveyor. This feature makes for a highly versatile system which is readily adjustable to varying load conditions and which allows for optimum use of available floor space.

To permit easy return of the augers and conveyor upon completion of a compost turning run they are pivotally interconnected at their base. When the turner has traversed the entire length of the compost pile the augers and conveyor may be returned to the initial starting position along a cleared section adjacent the pile or alternatively may be retracted from the V-shaped position into a substantially horizontal position for return over the compost bed to their original starting position at which point the unit is lowered into its V shaped orientation and the process is repeated.

The compost undergoing treatment is deposited on a floor provided with an air is injection system. To facilitate control of the ordor and temperature of air emanating from the pile and the temperature of air entering the pile the system is contained within a tent-like enclosure provided with ducts which capture the process air emanating from the pile for redirection through cooling coils as needed to maintain proper operating temperature of the air for recirculation through the compost pile or when appropriate to discharge the process air through biofilters before its release to the atmosphere. An air collection system such as contemplated for use in this invention is illustrated and described in U.S. Pat. No. 5,206,173 assigned to the assignee of the present invention the teaching of which is hereby incorporated by reference.

BRIEF DESCRIPTION OF THE DRAWINGS

For the purpose of illustrating the invention, there is shown in the drawings forms of apparatus which are presently preferred; it being understood, however, that this invention is not limited to the precise arrangements and

3

Figure 1:
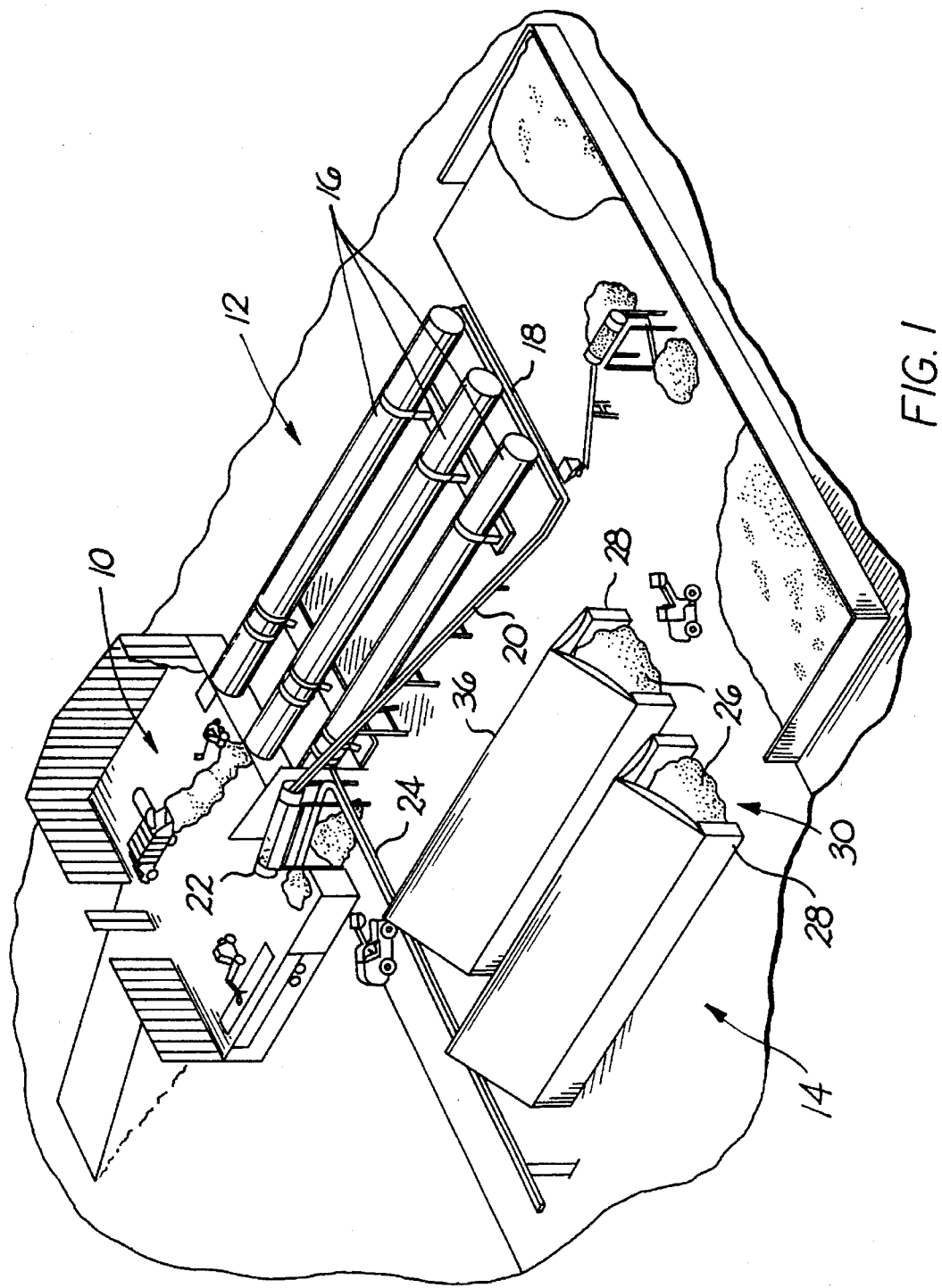
Figure 4:
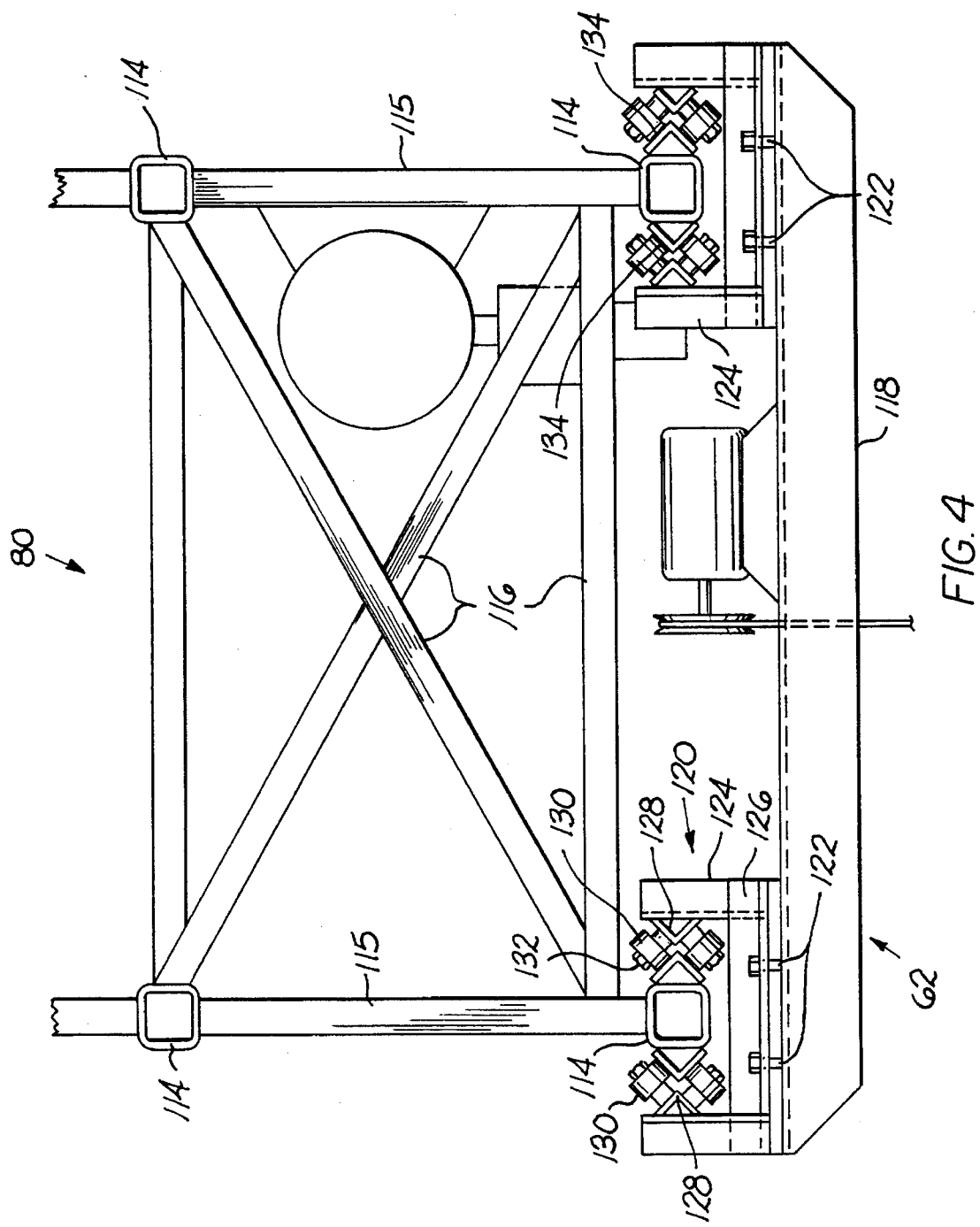
Figure 5:
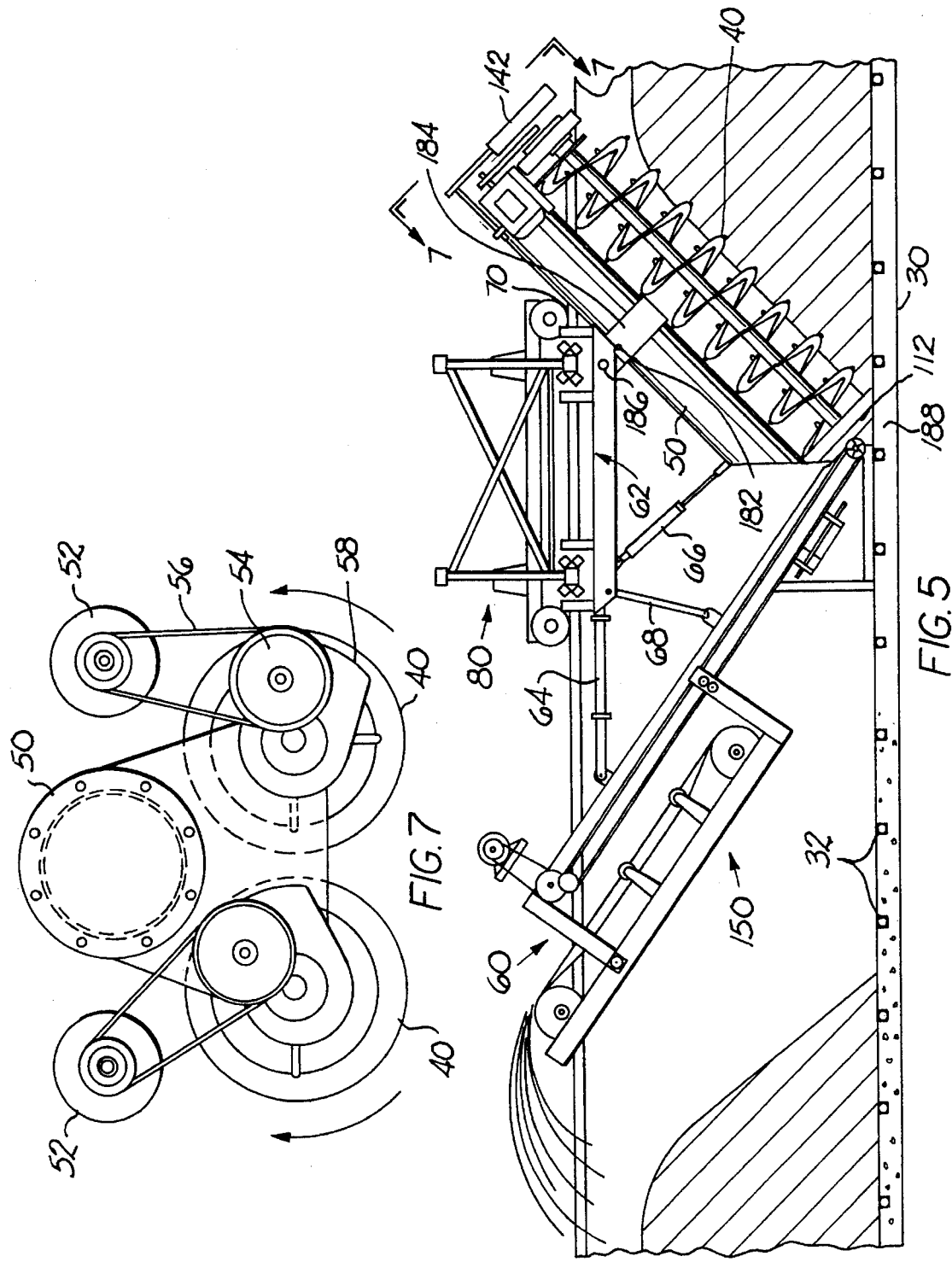
Figure 6:
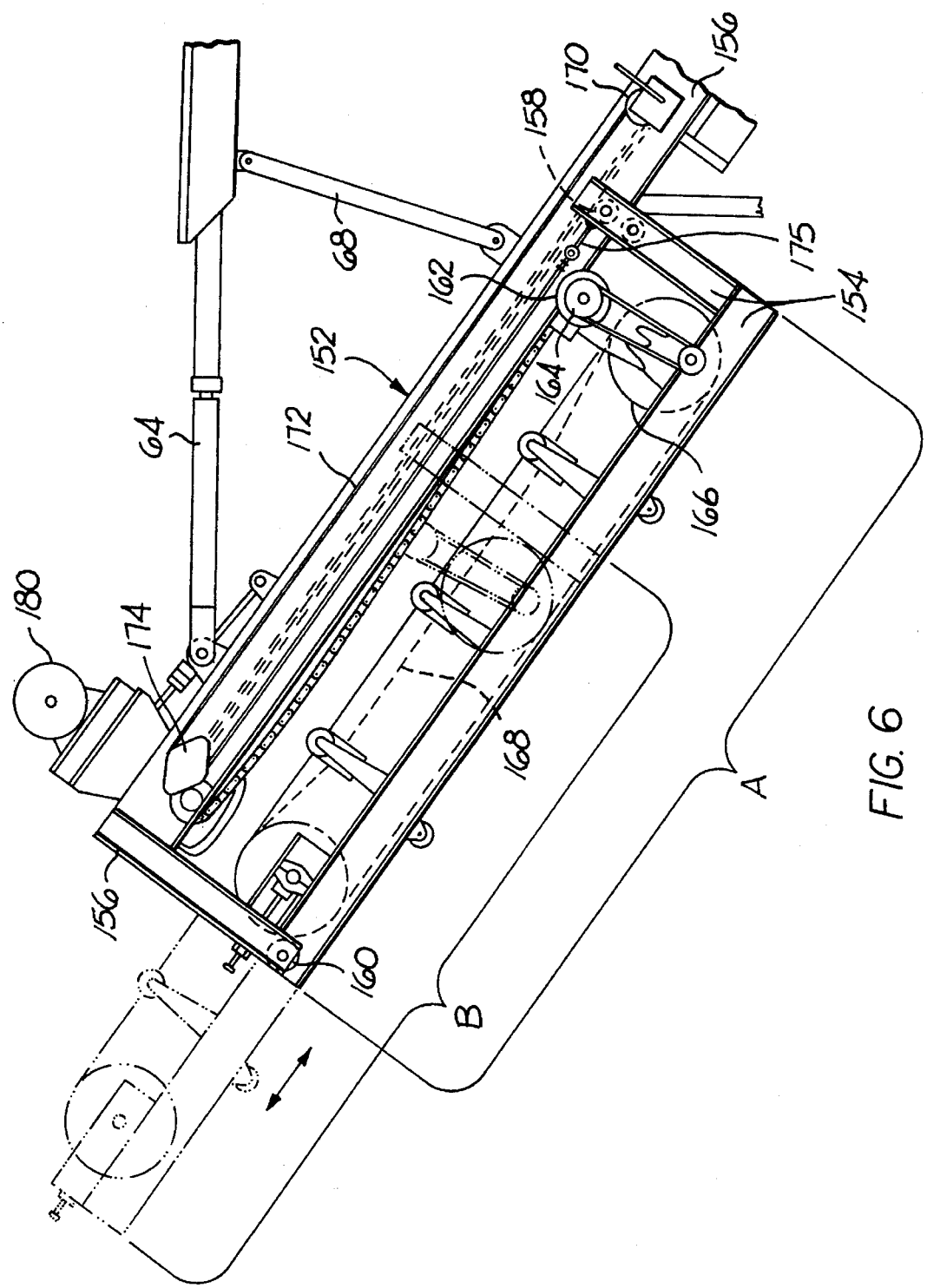
Figure 8:
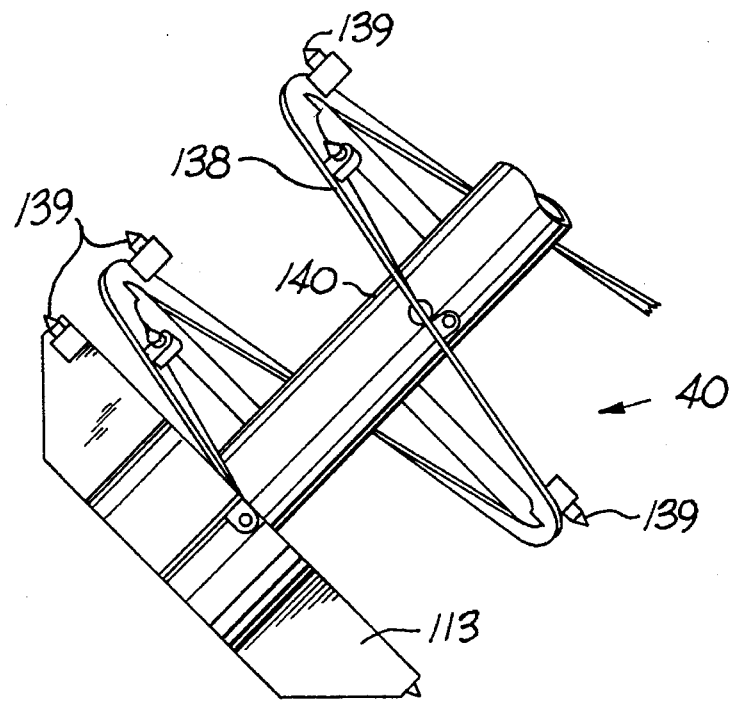
Figure 9:
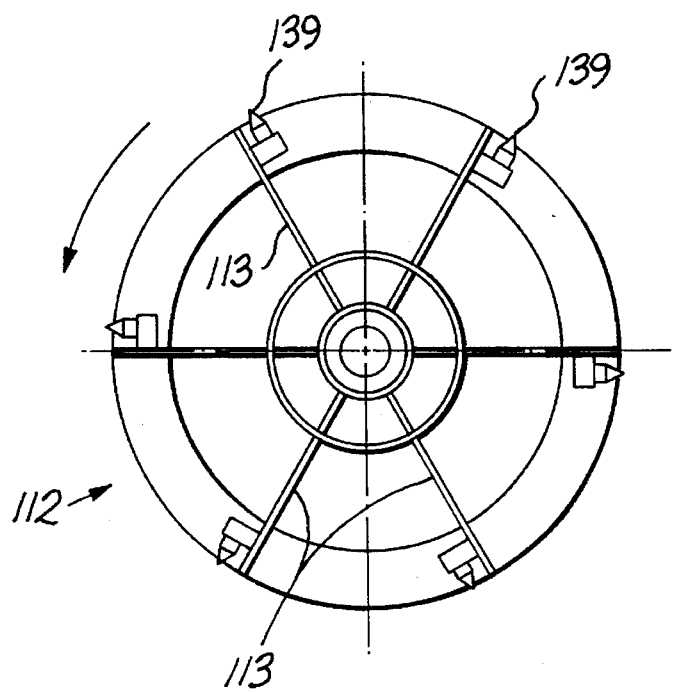
Figure 10:
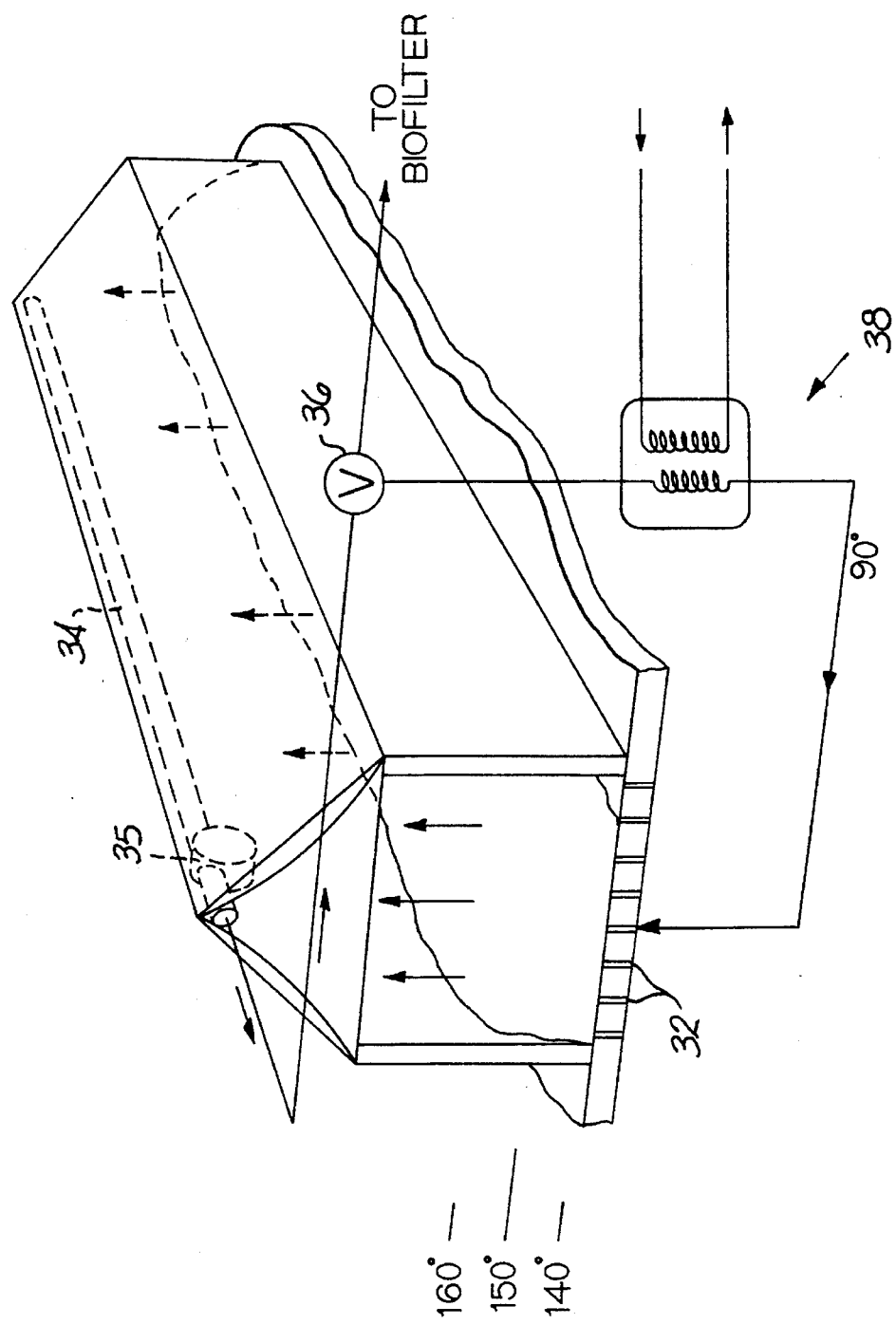
Figure 11:
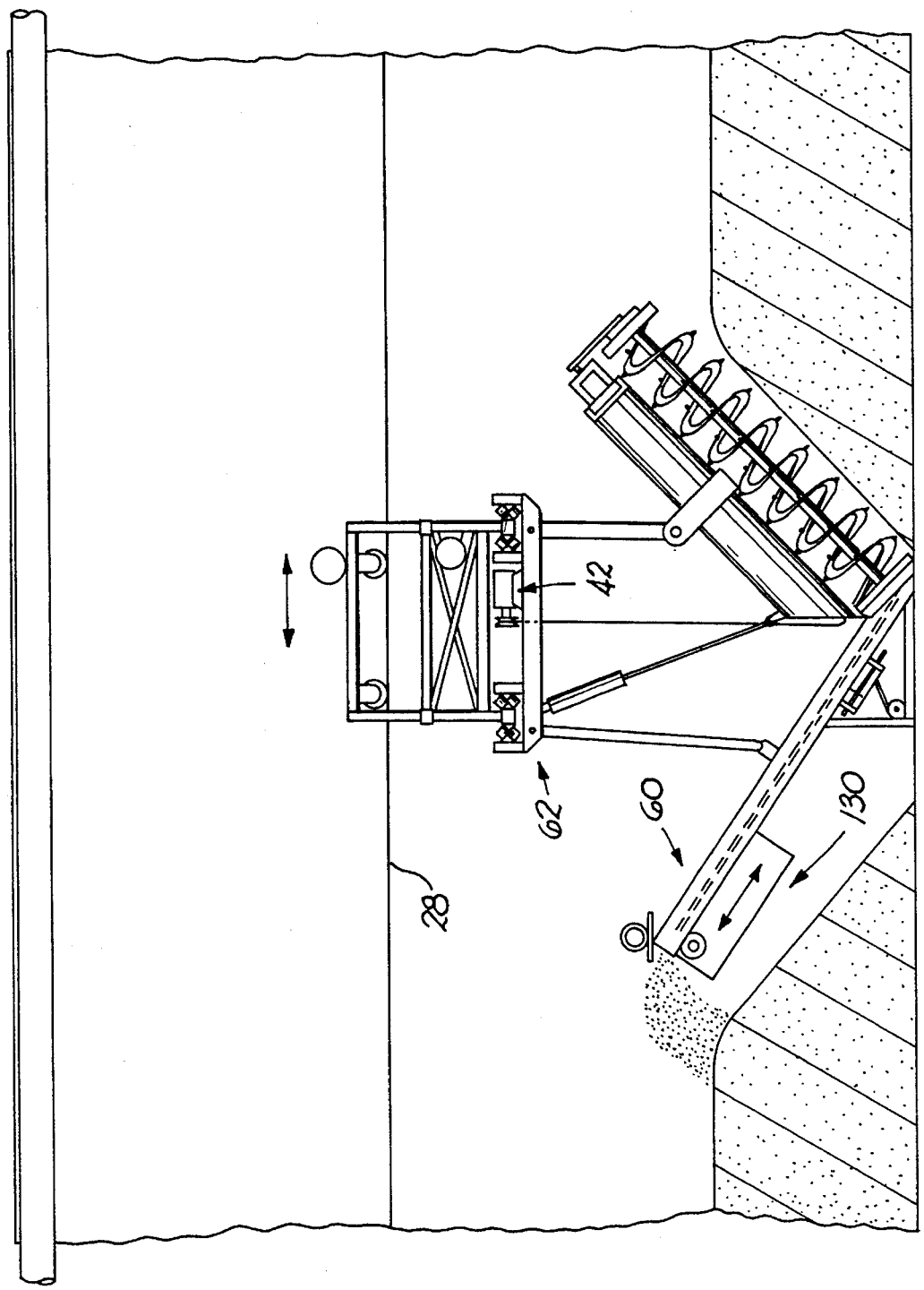

FIG. 1 is an isometric overview of a composting facility showing the compost curing area to which the present invention has particular application;

FIG. 2 is a side view of the compost turning apparatus and bridge crane;

FIG. 3 is a plan view of the turning apparatus and bridge crane;

FIG. 4 illustrates one form of carrier for transporting the turner along the bridge crane;

FIG. 5 is a front view of the turning apparatus;

FIG. 6 shows the conveyor system of the turner;

FIG. 7 illustrates the auger drive system;

FIG. 8 is a showing of the auger and paddle wheel construction;

FIG. 9 is a plan view of the paddle wheel;

FIG. 10 is a schematic showing of the air collection and air conditioning system; and FIG. 11 illustrates an alternative turner support system.

DETAILED DESCRIPTION OF THE INVENTION

Rapid rate aerobic composting is dependent on a number of factors. The most important are the ready supply of oxygenated air; optimization of temperature; optimization of compost moisture; and maximization of surface area through particulation of the partially cured compost. In order to achieve the above factors in treating an aerated static pile, the pile must be agitated, particulated and remoisturized on a regular basis.

A major drawback of prior art systems is their excessive power consumption and their lack of versatility. One prior art technique is to use a front end loader to turn the material. A major drawback to this method is its failure to properly fragment the material. On the contrary it promotes balling or lumping of the material. Furthermore, it is impossible to uniformly distribute moisture thoughout the material utilizing such a technique. It will be appreciated in the event of a breakdown in an enclosed system having retaining side walls a front-end loader is of little use, because of space limitations.

By way of example the invention will be described in connection with the curing of compost from digesters having a daily output of 55 tons of partially cured compost per day. It will be understood that the constructional details and power requirements of the system will of necessity vary depending on the specific application in which the system is employed.

Referring now to the drawings and more particularly to FIG. 1 thereof, there is shown a composting facility comprised of three major areas, the tipping are 10, a processing area 12 and an aeration or curing area 14. Solid waste is dumped and sorted in the tipping area 10. Unacceptable waste, such as white goods, car batteries, tires, large pieces of wood, etc., is rejected and sent to a landfill. Acceptable waste is then fed into digesters 16. Sewage sludge delivered to the plant is stored in a liquid sludge tank from where it is pumped by liquid sludge pumps directly into the digesters 16 as needed to maintain the proper carbon/nitrogen ratio essential to efficient composting.

A typical digester designed to co-compost municipal solid waste and municipal sewerage sludge and having an output of 55 tons of partially cured compost per day is 180 feet long and has an internal diameter of 12½ feet. The material is processed through the digester for a period of three days. The digester is typically divided into three fermentation chambers or stages by means of internal partitions. Material is discharged from the digester after approximately three days of residence time. Upon removal from the digester the material, now compost plus non-degradables, is transported by belt conveyors 18 and 20 to a trommel screen 22 where it is rough screened into two fractions. One is the residue, which fails to pass through the screen. This residue is discharged back onto the tipping floor from where it is transported to a landfill for disposal. The second fraction is rough, or partially cured, compost. The partially cured compost is conveyed to the curing area 14 by belt conveyor 24. It is the curing area to which the present invention has specific application.

As seen in FIG. 1 the curing area 14 is comprised of a series of tent-like enclosures or bays 26. Each of the bays is approximately 75 feet wide and is bounded by reinforced cement walls 28 approximately 8 inches thick and 10 feet high. The bays may be of varying length depending on the specific application. In the present example the bays are approximately 300 feet long. Each bay houses compost piled 6 to 8 feet high. The compost is turned daily to ensure proper curing and to make room for the daily output of the digesters. The cement floor 30 of the enclosure is designed to permit aeration of the enclosed compost through a system of perforated pipes disposed in recesses provided in the floor. To cure the compost it must be maintained at a temperature of approximately 55 degrees Celsius and periodically turned to achieve the requisite pathogen kill.

To insure that air reintroduced into the curing stage of the process is at the proper temperature, or, to deodorize it if it is to be released outside of the processing unit, the arrangement shown in FIG. 10 is employed.

Air is injected into the compost pile through an air distribution system 32 embedded in the floor of the bay. Air emanating from the pile is at an elevated temperature due to the exothermic reaction taking place within the pile. Air emanating from the pile is collected by means of a duct 34 and associated blower means 35. Collected air is redirected by valve means 36 for reuse in the curing process or shunted through biofilters before release outside the unit. Temperature of reinjected air is controlled by means of heat transfer unit 38.

By turning the compost contained in a bay of the above dimensions once per day using the compost curing system comprising this invention sufficient storage space is produced to accommodate the output of two digesters of the type described. The turner is designed to move the entire body of compost contained within the bay back 15 feet from the initial loading area. This leaves a volumnmetric area 70 feet by 15 feet by 7 feet (7,350 cubic feet). Assuming a compost density of 30 pounds per cubic foot there is room for approximately 110 tons of compost per day or enough volume to accommodate the output of two digesters.

To meet the above requirements the augers 40 of the turner are designed to cut a swath one foot wide on each side-to-side traverse. In the example here being discussed the conveyors are positioned to effect an overall displacement or throw of the compost 15 feet from its initial position. Upon completion of the turning cycle the entire body of material is moved 15 feet from its initial position. Each side-to-side traverse is designed to take approximately 4.5 minutes so that traverse of the entire pile from front to back takes 22.5 hours leaving an hour and one half for return of the unit to its starting position and for any required maintenance. If faster return of the compost turner to its starting position is desired the speed of return can be easily adjusted by means hereinafter discussed.

The turner itself is of V-shaped configuration. Referring to FIGS. 5 and 7 one leg of the V is comprised of a pair of counter-rotating ribbon augers 40 carried by an auger support column 50. Each of the augers, as seen in FIG. 7 is powered by a 40 HP 3 phase AC motor 52 running at 1750 rpm. Each motor is coupled to a sheave 54 by a V-Belt 56 which acting through a screw conveyor drive 58 turns the augers 40 at 60 rpm. The other leg of the V is comprised of a dual conveyor system 60. The entire compost turner assembly is pivotally supported on carriage 62 by means of hydraulic cylinders 64 and 66 beam 68, and gusset assembly 70. This arrangement allows positioning of the augers at the angle of repose of the compost pile. By achieving this adjustment of the augers relative to the pile the power needed to carry out the turning function can be dramatically reduced.

The carrier in turn is movably suspended on the overhead bridge crane 80. The bridge crane 80 as seen if FIGS. 2 and 3, carries a winch drum 82 powered by reversible motor 84 for moving the carrier along the crane. The crane is moved in incremental steps along the bay wall 28 by means of winch drum 86 powered by timed operation of reversible motor 88.

Movements of the crane and carrier can conveniently be done through use of a computer located at a remotely positioned work station. When it is desired to rapidly return the crane to its starting position upon completion of its front-to-back sweep the speed of the drive motor 88 can be increased by use of a frequency drive system. Alternatively a DC motor could be used with rheostat control of the field windings.

The side to side movement of the carriage is achieved through use of cable 90 secured at either end to the turner assembly 92 through pulleys 94 and 96. The cable 90 is wrapped around the winch drum 82. Limit switches, not shown, located at either end of the side-to-side traverse operate the reversing motor 84. The bridge crane is moved in one foot increments from front to back upon completion of each side-to-side traverse. The means shown for moving the bridge crane comprises a ½ inch wire cable 100 wrapped around winch drum 86. As noted above drum 86 is powered by timer-controlled motor 88. The cable 100 is secured at one end to the concrete wall 28 and at its opposite end to a stationary structure 102. As seen in FIG. 3 a parallel cable 104 runs from front to back through pulleys 106 and 108 secured to the bridge crane. The cable 104 is anchored at both ends to a fixed structure and serves to prevent crabbing movement of the crane. To vary the speed of either the side-to-side movement of the carrier or the front-to-back movement of the bridge crane a variable frequency drive arrangement can be electrically coupled to either motor. To facilitate movement of the crane one end of the crane is provided with wheels 98 which run on a track carried on the top surface of one of the bays retaining walls 28 and the opposite end is supported on a wheeled beam structure 110 riding on the floor of the curing area. Any number of means of providing locomotion of the compost turning apparatus are possible such for example as the use of a three or four wheeled structure for supporting the crane in overlying relation to the compost pile and to guide its movement relative to the pile manually or by lasers, directional wires or other suitable means.

As previously noted the augers 40 are uniquely arranged to comply with the angle of repose normally assumed by a compost pile of six to eight feet in height. By arranging the augers in this fashion, there is minimal cascading of compost as each traversing cut is made. The arrangement results in reduced loading of the auger drive train with concomitant reduction in energy consumption as compared to prior art compost turning systems. To facilitate transfer of compost from the augers to the conveyor belt, a paddle wheel 112, FIGS. 8 and 9, is positioned at the base of the augers to further fragment and disperse the compost onto the conveyor system 60 for deposit into newly formed piles or windrows. The paddle wheel is comprised of vanes 113 provided at their outer ends with replaceable Sandvik® blocks 139 with teeth.

When it becomes important from an economic standpoint to bring the turning apparatus over the pile rather than along the side of the pile, thereby saving floor space, the bridge crane can be elevated to permit retraction of the legs of the turner to a substantially horizontal position for return over the compost pile to its initial starting position.

In such instances the support arrangement shown in FIG. 11 can be employed. The turner upon completion of a turning cycle can be retracted by means of a motor operated winch 42 into a generally horizontal position thereby enabling the turner to be returned over the compost pile to its starting position. In this embodiment the links connecting the turner to the carrier 62 are extended and the carrier and crane are elevated the required distance. This arrangement eliminates the need of providing a return path for the turner which lies outside the compost pile as seen in FIG. 2, thus reducing construction costs incident to enlarging the required floor space. This is particularly advantageous in large installations requiring a plurality of compost curing bays and associated turners.

In instances where vertical space is at a premium the support arrangement shown in FIG. 5 can be employed utilizing a return path outside the compost pile. In this embodiment the bridge crane extends over the compost pile to an extent allowing the turner to be returned to its starting position free of the compost pile. One end of the crane rides in a track 46, FIG. 3, carried by a side wall 28. The opposite end of the crane is supported by a three wheeled structure 110 only one wheel of which is shown for clarity of illustration.

Structurally the bridge crane as seen in FIG. 4 is made up of 3 inch by 3 inch by 3/16 inch thick tubing 115 welded at both ends to seven inch square tubing 114 having a wall thickness of 3/8 of an inch. Cross braces 116 consisting of 3 inch by 3 inch by ¼ inch thick angle irons provide the required rigidity and strength to the bridge crane.

The support carriage 62 to which the compost turner assembly 92 is attached is made up of two 8 inch by 8 inch by 3/8 inch thick beams 118 nine and one half feet long to which four vertical angle irons 124 and four cross members 126. Mounted to the vertical members 124 are angle irons 128 to which Osborn® rollers 130 are secured by bolts 132. The rollers run on angle irons 134 secured to the bridge crane tubing 114 and which extend the entire length of the crane.

As seen in FIG. 8, the augers 40 are desirably constructed of half pitch ribbon blades 138. Mounted at spaced intervals around the perimeter of the blade are replaceable Sandvik® blocks 139. This construction is utilized to prevent the drive spindle 140 of the screws from becoming clogged with compost which is oftentimes composed of sticky somewhat adhesive material. In those situations where the compost is extremely sticky, the blades can be covered with UH19W plate or a teflon overlayment. The flights of the conveyor can be similarly treated where necessary. In situations where the compost is not of a sticky consistency, half pitch ribbon screws may not be necessary. In any event, means are desirable provided for allowing the escape of material from the screw blade so that piling up on the main drive spindle does not take place. As seen in FIG. 7, the twin ribbon screws are operated in counter rotation. This serves to mix the compost and allows moisture to be added when necessary by means of an attached spray bar 142 disposed in overlying relation to the twin screws. This arrangement allows the compost to be thoroughly mixed and hydrated before it leaves the turning machine.

By utilizing a twin-screw configuration, and adjusting the augers angle of attack the system can be made to operate in a low energy consumption mode. The compost being turned is always moving downhill and being aided by gravity along the slope of the screw blades which is the natural angle of repose of the material. When compost reaches the base of the screw, counter rotating paddle wheels 112 serve to sweep the compost into the throat of chain conveyor 152 for transport by the conveyor system into newly formed piles. The main conveyor 152 is carried by a 17 foot long frame 156 and is powered by a 20 HP 3 phase motor 180 which acting through sheaves and a speed reducer drives the conveyor at a speed of 200 feet per minute.

A unique feature of the conveyor system is the use of an auxiliary conveyor 150 mounted under the main conveyor 152. The sub-conveyor is mounted on frame 154 movably supported on the main conveyor frame 156 by means of rollers 158 and 160. The sub-conveyor is powered by a 5 HP 3 phase motor 162 running at 1750 rpm which acting through sheaves 164 and speed reducer 166 drives a 48 inch wide 23 feet long conveyor belt 168 at a speed of 1000 feet per minute.

The distance the subconveyor can be extended may be adjusted through use of a hand operated winch 170. The winch is connected to the sub-conveyor frame by means of wire cable 172 running through block 174 mounted to depending arm of the main conveyor frame. The cable is attached at its far end to turnbuckle 175 mounted to upright member 154 of the sub-conveyor frame. This adjustability feature permits easy adjustment of the overall throw of the system and permits advantage to be taken of the daily modification in stacking height of the stored compost occurring as a natural result of settling. This feature permits optimizing the use of available storage space.

As previously noted the auger assembly is pivotally mounted to the support carriage through gusset 182 welded to a ⅜ inch thick 12 inch wide band 184 secured to the auger support column 50. The free end of the gusset is rotatably supported on a 6 foot long 6 inch diameter hard rolled steel pin 186. The auger and conveyor assemblies are in turn pivotally joined at their base by two 1⅝' cold rolled pins 188 to permit their angular adjustment.

The above described curing system prevents overloading the drive system, and minimizes power consumption. The overall composite of features, consisting of raking the compost from the pile, followed by agitating and mixing the compost through the combined use of counter-rotating screws and a beater produces a finely divided material which is essential in optimizing rapid rate aerobic composting. This arrangement coupled with the air collection and air conditioning system shown in FIG. 10 and herein described provides an economic and highly versatile compost curing system.

It will be understood that structural and dimensional modifications differing from those described and illustrated will be required to meet varying circumstances and that the present invention may be embodied in other specific forms without departing from the spirit or essential attributes thereof and, accordingly, reference should be made to the appended claims rather than to the foregoing specification as indicating the scope of the invention.

I claim:

1. A compost curing system comprising;

a bay containing compost to be cured, said bay having at least one longitudinally extending side wall, a floor and having off-loading and loading areas;

compost turning apparatus comprising a generally V-shaped mechanism one leg of the V consisting of a pair of counter-rotating augers and the other leg of the V consisting of a conveyor, and said legs being hinged at their common base position to permit their angular adjustment;

a bridging crane overlying compost within said bay, one end of the crane being supported on said side wall and the opposite end being supported on said floor by a wheel-footed beam;

a support carriage adapted for movement along said crane;

means pivotally interconnecting said compost turning apparatus to said carriage;

means for energizing said augers and conveyor and for moving said carrier means and attached apparatus along said crane and for positioning the augers in the off loading area in contact with edge portions of the compost pile whereby the compost is fragmented and conveyed down said auger and deposited onto said conveyor for transport into newly formed piles;

means for moving said crane in incremental steps along said side wall upon completion of each side-to-side traverse of said carrier means, the composite movements of said crane and carrier resulting in said turning apparatus traversing the entire body of compost within said bay; and means for returning said apparatus to the off-loading area to permit repetition of the turning cycle.

2. A compost curing system comprising;

a bay containing compost to be cured, said bay including a pair of spaced longitudinally extending side walls and a floor and having off-loading and loading areas;

means for injecting air into said compost;

compost turning apparatus comprising a generally V-shaped mechanism one leg of the V consisting of a pair of counter-rotating ribbon augers and the other leg of the V consisting of a conveyor, said legs being hinged at their common base position to permit movement of the legs from their V-shaped orientation to a generally straight line orientation;

a bridge crane movably supported on said side walls;

carrier means movably mounted to said bridge crane;

means pivotally interconnecting said compost turning apparatus to said carrier means and for positioning the augers of said apparatus in contact with edge portions of the compost;

means for energizing said augers and conveyor and means for moving said carrier means and attached apparatus along said bridge crane from side wall to side wall whereby said augers rake off layers of the compost for movement down the blades of the augers onto said conveyor for transport into newly formed piles; and means for moving said bridge crane in incremental steps along said side walls upon completion of each side-to-side traverse of said carrier means; the composite movements of said bridge crane and said carrier means resulting in said turning apparatus traversing the entire body of compost within said bay.

3. The system set forth in claim 1 including means for elevating the legs of said apparatus to a substantially in-line position overlying the compost within said bay said apparatus completing its transverse of the compost within the bay;

means for returning said apparatus over said compost to the off-loading area; and means for lowering said legs into their original V-shaped position to permit repetition of the turning cycle.

4. The system set for in claim 1 including means forming an enclosure covering said bay.

5. The system set forth in claim 4 including duct means within said enclosure and associated blower means for capturing air emanating from compost within said enclosure and means for circulating captured air through the enclosed compost.

6. The system set forth in claim 5 including heat transfer means for regulating the temperature of air undergoing recirculation and means for reintroducing heat-regulated air into compost within said enclosure.

7. The system set forth in claim 6 including valve means for directing captured air either for recirculation through compost within said enclosure and/or for release to the atmosphere.

8. The system set forth in claim 7 including means for deodorizing the air prior to its release to the atmosphere.

9. The system set forth in claim 8 wherein said deodorizing means comprises a biofilter.

10. A compost turner of generally V-shaped configuration, one leg of the "V" comprising a pair of counter-rotating ribbon augers and the other leg comprising conveyor means, said augers and conveyor means being pivotally interconnected at their common base position and to a motorized conveyance.

11. A compost turner as set forth in claim 10 including paddle wheels mounted to the base of each auger for rotation therewith.

12. A compost turner as set forth in claim 10 wherein said conveyor means consist of a pair of conveyors one of which is extendable relative to the other.

* * * * *